United States Patent [19]

Haker et al.

[11] Patent Number: 4,673,420

[45] Date of Patent: Jun. 16, 1987

[54] DESICCANT DRYER

[76] Inventors: Leroy C. Haker, 1091 Rice Rd., Elma, N.Y. 14059; William Kitto, 4900 W. St. Charles St., Lake Charles, La. 70605

[21] Appl. No.: 827,404

[22] Filed: Feb. 10, 1986

[51] Int. Cl.⁴ ............................................. B01D 53/04
[52] U.S. Cl. ...................................... 55/179; 55/387; 55/484; 55/516
[58] Field of Search ................. 55/179, 316, 387, 475, 55/484, 516, 518; 210/264, 282, 290

[56] References Cited

U.S. PATENT DOCUMENTS

| | | | |
|---|---|---|---|
| 2,362,933 | 11/1944 | Schaefer | 55/387 |
| 2,622,414 | 12/1952 | Jaubert | 55/179 X |
| 2,669,318 | 2/1954 | Briggs | 55/387 |
| 3,064,819 | 11/1962 | Jones | 55/387 X |
| 3,186,148 | 6/1965 | Merrill et al. | 55/387 |
| 3,821,975 | 7/1974 | Haker | 81/461 |
| 3,891,417 | 6/1975 | Wade | 55/316 X |
| 3,926,599 | 12/1975 | Rudin et al. | 55/387 |
| 3,969,095 | 7/1976 | Kurahashi | 55/387 X |
| 4,259,097 | 3/1981 | Patel et al. | 55/316 |
| 4,478,619 | 10/1984 | Arends et al. | 55/316 |

FOREIGN PATENT DOCUMENTS 1155259  4/1958  France ............................... 55/179

Primary Examiner—Robert Spitzer
Attorney, Agent, or Firm—Christel, Bean & Linihan

[57] ABSTRACT

A desiccant dryer utilizes a desiccant containing canister, a housing substantially enclosing the canister and a tubular member mounted within the housing. The canister includes two concentrically-arranged and cylindrically-shaped inner and outer walls and two end walls positioned at opposite ends of the canister and which join the inner and outer walls. A quantity of desiccant is positioned within the space between the inner and outer walls, and the housing defines an inlet opening and an outlet opening for gas entering and leaving the dryer. The tubular member has an open end and a closed end and is supported within the housing so that its open end corresponds with the housing inlet opening and the closed end is positioned within the housing interior. The tubular member includes a foraminous portion which extends between the housing inlet opening and the closed end and through the interior of the canister inner wall so that gas flowing between the housing inlet and outlet openings flows radially out of the foraminous portion and radially through the canister between the inner and outer walls.

22 Claims, 5 Drawing Figures

DESICCANT DRYER

BACKGROUND OF THE INVENTION

This invention relates generally to the dryer art and relates, more particularly, to a desiccant dryer which is connectable within a gas line or the like for absorbing moisture contained in gas flowing through the line.

The type of dryer with which this invention is to be compared commonly includes two cylindrical containers, or towers, each filled with desiccant supported therein in a packed bed arrangement and adapted to accommodate a flow of gas from one container end to the other. Such towers are typically connected in parallel flow relation with one another in a gas line so that the gas flowing therethrough can be selectively directed through one tower or the other. Commonly, such towers are oriented generally vertically when in use and are thus referred to as twin towers and are utilized at the site of a natural gas well for drying natural gas which exits the well.

One limitation associated with the aforedescribed twin towers relates to the capacity of the towers to effectively dry gas flowing therethrough. It is believed that in order to maximize the drying capacity of dryer desiccant, the dispersion or distribution of the gas flow across any cross section of desiccant must be relatively uniform. However, the desiccant held in a packed bed arrangement within each of the aforedescribed towers is known to channel or lift as the result of gas flow surges. Such channelling creates favored flow paths for gas moving from one end of the tower to another so that the distribution of the gas flow across each cross section of desiccant is not uniform. Thus, the packed bed arrangement of conventional twin tower dryers is believed to prevent the drying capacity of the dryer desiccant from being maximized.

Other limitations of the twin tower dryer relate to the relatively high pressure drop of gas flowing from one end of a tower to another and the difficulty attending the replacement of desiccant within each tower.

An object of the present invention is to provide a new and improved desiccant dryer which circumvents aforedescribed limitations associated with conventional twin tower dryers.

An additional object of the present invention is to provide such a dryer wherein the desiccant contained therein is prevented from channelling and provides a relatively uniform flow of gas across any cross section of desiccant contained therein.

Another object of the present invention is to provide such a dryer which requires no operating power thus rendering it practical for use in remote locations.

Still another object of the present invention is to provide such a dryer wherein the desiccant contained therein can be easily and quickly replaced.

Yet still another object of the present invention is to provide such a dryer which can be used in an assembly of dryers of like construction to permit a user to size the assembly to accommodate a wide variety of gas flow rates and flow pressure differentials as measured across the assembly.

A further object of this invention is to provide such a dryer providing a relatively low pressure drop in a gas line when placed therein.

A still further object of the present invention is to provide such a dryer which is efficient, effective and reliable in operation.

A yet still further object of the present invention is to provide such a dryer which is economical to construct.

One more object of the present invention is to provide such a dryer wherein the cost of desiccant for maintaining the dryer in operation is relatively low.

SUMMARY OF THE INVENTION

This invention resides in a new and improved desiccant dryer for use in a gas flow line or the like for absorbing moisture contained in gas flowing through the line.

The dryer includes a canister containing desiccant and means defining a substantially enclosed housing in which the canister is positioned. The canister includes means defining an annular cavity having two concentrically-arranged and cylindrically-shaped inner and outer walls and two end walls positioned at opposite ends of the cavity and which join the inner and outer walls. Each of the inner and outer walls are gas-permeable, and a quantity of desiccant is positioned within so as to substantially fill the defined annular cavity. The housing-defining means of the dryer includes means defining an inlet opening and an outlet opening for gas entering and leaving the housing.

The dryer further includes routing means associated with the housing for routing gas from the housing inlet opening into the interior of the cylindrically-shaped inner wall of the canister means so that gas flowing through the housing is directed radially outwardly through the annular cavity and the quantity of desiccant contained therein and toward the housing outlet opening. The desiccant canister facilitates the changing of desiccant within the dryer, and the flow path of gas through the desiccant contributes to the effectiveness of the dryer and to a relatively low pressure drop between the inlet and outlet openings of the housing.

BRIEF DESCRIPTION OF THE DRAWING FIGURES

DETAILED DESCRIPTION OF ILLUSTRATIVE EMBODIMENTS

Figure 1:
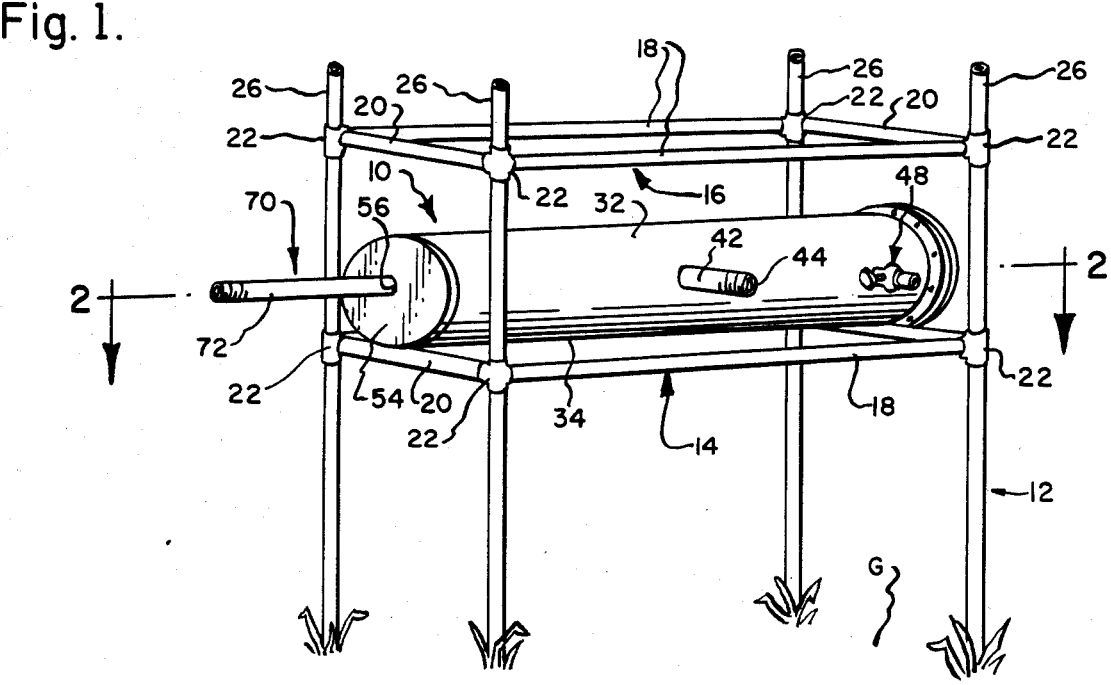
FIG. 1 is a perspective view of an embodiment of a dryer in accordance with the present invention.

Turning now to the drawings in greater detail and considering first FIG. 1, there is shown an embodiment of the desiccant dryer generally indicated 10 and in accordance with the present invention, and as it would appear when utilized at the site of a natural gas well. The dryer 10 is supported above the ground G by means of a support frame 12 and, as will be explained in greater detail hereinafter, is adapted to be connected in the network of piping leading from the well so that gas exiting the well is routed through the dryer 10 for purposes of drying the gas.

As shown in FIG. 1, the support frame 12 includes two pairs 14 and 16 of elongated brace assemblies joined by four vertical posts 26, 26. Each brace assembly 14 or 16 includes two longitudinally-extending bars 18,18 and two transversely-extending bars 20,20. The end of each bar 18 or 18 is coupled to a corresponding bar 20 or 20 by means of a coupling 22 to form a rectangular frame. Furthermore, each brace assembly 14 or 16 is arranged generally in a horizontal plane so that one assembly 16 is positioned directly above the other assembly 14.

Each coupling member 22 includes a sleeve or collar portion which opens along a vertical path for slidably accepting corresponding one of the posts 26,26 when the assemblies 14 and 16 are oriented in horizontal planes as aforedescribed and includes an internally-mounted set screw adapted to be tightened against the post received by the collar portion. As shown in FIG. 1, the dryer 10 rests across the lower brace assembly 14 in a spaced relationship with the ground G, and it will be understood from the above that by loosening the appropriate collar portions and moving the brace assembly 14 relative to the posts 26,26 in a vertical direction, the height of the dryer 10 is measured from the ground G can be adjusted.

Figure 2:
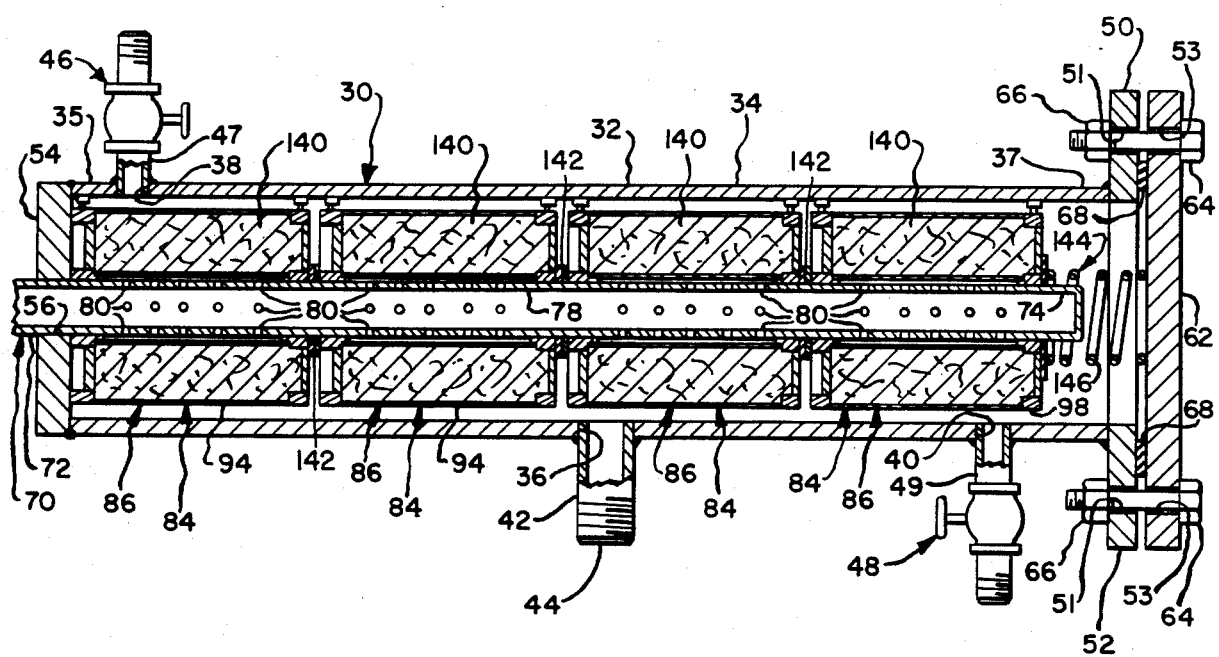
FIG. 2 is a longitudinal cross-sectional view taken about on line 2—2 of FIG. 1.

With reference to FIG. 2, the dryer 10 includes means, generally indicated 30, defining a substantially enclosed housing 32 through which gas is directed. The housing 32 includes a hollow cylindrical steel shell 34 having two opposite ends 35,37 and three openings 36,38,40 in the shell sidewall as shown. The opening 36 is positioned substantially midway between the ends 35,37, the opening 38 is positioned adjacent the end 35, and the opening 40 is positioned adjacent the end 37. Closely received by the opening 36 and welded to the shell 34 is a conduit 42. As will be apparent hereinafter, the conduit 42 defines a housing outlet opening 44 through which gas exits the dryer 10 and is externally-threaded for accepting a pipe coupling (not shown). Fixedly received by the remaining sidewell openings 38 and 40 welded to the sidewall are nipples 47 and 49, respectively, to which valve assemblies 46 and 48, respectively, are attached. The nipples 47,49 provide access to the interior of the housing 32 for purging purposes and are externally-threaded for selectively receiving valve assemblies 46,48, as shown, or pressure gauges (not shown).

The housing 32 further includes a planar ring-like member 50 welded to the shell end 37 so as to provide the shell end 37 with an annular flange 52. The ring 50 defines a plurality of openings 51,51 which each have a longitudinal axis which is oriented generally parallel to the longitudinal axis of the shell 34.

As shown in FIG. 2, the housing 32 further includes a planar and circular end plate 62 releasably attached to the annular flange 52. More specifically, the end plate 62 defines a plurality of openings 53,53 which are aligned with the openings 51,51 of the flange 52, and bolts 64,64 extend through the aligned openings. Nuts 66,66 are tightened upon the bolts 64,64 so that the flange 52 and end plate 62 are tightly held together between the heads of the bolts 64,64 and the nuts 66, 66. For effectively sealing the engaging surfaces between the plate 62 and flange 52, a ring-like gasket 68 is positioned therebetween. As will be apparent hereinafter, the end plate 62, when removed, provides access to desiccant contained within the dryer 10.

With reference still to FIG. 2, the housing 34 also includes a relatively thick end plate 54 welded to the sleeve end 35 so as to substantially close the end 35. The end plate 54 defines a central opening 56 through which gas flows when entering the housing 32.

With reference still to FIG. 2 and in accordance with the present invention, the dryer 10 includes a hollow tubular conduit or member 70 extending axially into interior cavity of the housing 32 through the end plate opening 56. The tubular member 70 has an open end 72, a closed end 74 and is so arranged in relationship with the housing 32 that the open end 72 opens outwardly of the housing interior and the closed end 74 is positioned within the housing interior. As shown in FIG. 2, the tubular member 70 includes a foraminous portion 78 which extends between the closed end 74 and the plate opening 56 for a substantial distance along the length of the housing 32. Furthermore, the tubular member 70 is constructed of steel and is fixedly joined, as by welding, to the end plate 54 so that the foraminous portion 78 is supported in a cantilever fashion within the housing 32. Defined along the surface of the foraminous portion 78 is a plurality of apertures 80,80 disposed about the circumferential periphery and along the length of the portion 78.

The open end 72 of the tubular member 70 is externally-threaded for accepting a gas pipe coupling so that gas entering the housing 32 through the end plate opening 56 enters the open end 72 of the tubular member 70 and passes radially out of the foraminous portion 78 through the apertures 80,80 defined therealong.

With reference to FIGS. 2–74 and in accordance with the present invention, the dryer 10 includes four desiccant-containing canisters, generally indicated 84,84 positioned in an end-to-end relationship within the housing 32 so as to surround the apertures 80,80 defined by the tubular member portion 78. Each canister 84 or 84 includes means, generally indicated 86, defining an annular cavity having two concentrially-arranged and cylindrically-shaped inner and outer walls or sleeves 92 and 94, respectively, and two opposite end members 96,98 positioned at opposite ends of the canister 84. The sleeves 92,94 are constructed of a relatively strong, gas-permeable material such as a wire mesh, and the end walls 96 and 98 are constructed of gas-impermeable steel members hereinafter described.

The end walls 96,98 include rigid inner rings 100,102, rigid outer rings 104,106, and means in the form of a plate or frame for joining the inner and outer sleeves 92 and 94. The inner rings 100,102 are suitably attached at each end of the inner sleeve 92 and define aligned central openings for closely and slidably receiving the tubular member 70. Similarly, the outer rings 104,106 are suitably attached at each end of the outer sleeve 94 and have outer diameters which are each substantially equal to the outer diameter of the outer sleeve 94 which is, in turn, slightly smaller in diameter than the inner diameter of the housing shell 34. The outer rings 104,106 define a plurality of internally-threaded apertures in which are received centering screws 108,108. As will be apparent hereinafter, the screws 108,108 maintain a spacing between the outer sleeve 94 and the inside wall of the housing shell 34 and can be tightened or loosened within the corresponding threaded apertures so that the canister 84 can be centered within the housing 32.

Figure 3:
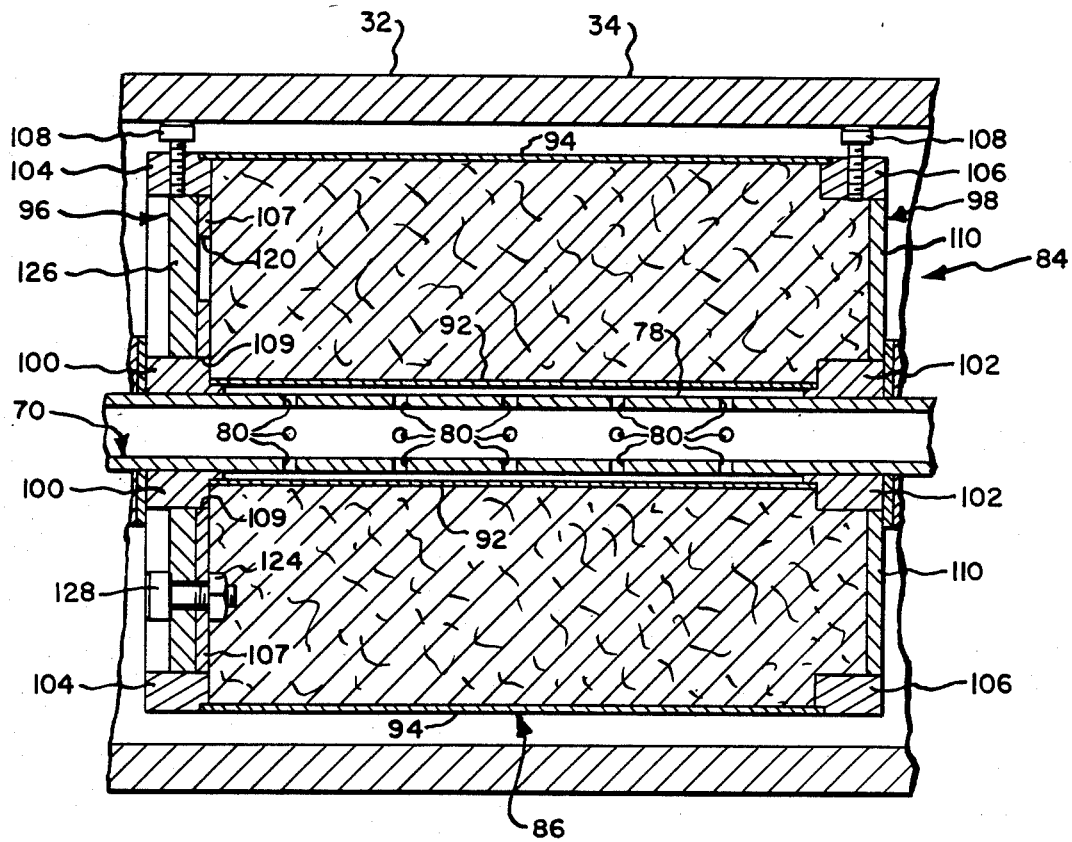
FIG. 3 is a fragmentary view similar to that of FIG. 2 and drawn to a slightly larger scale.
Figure 4:
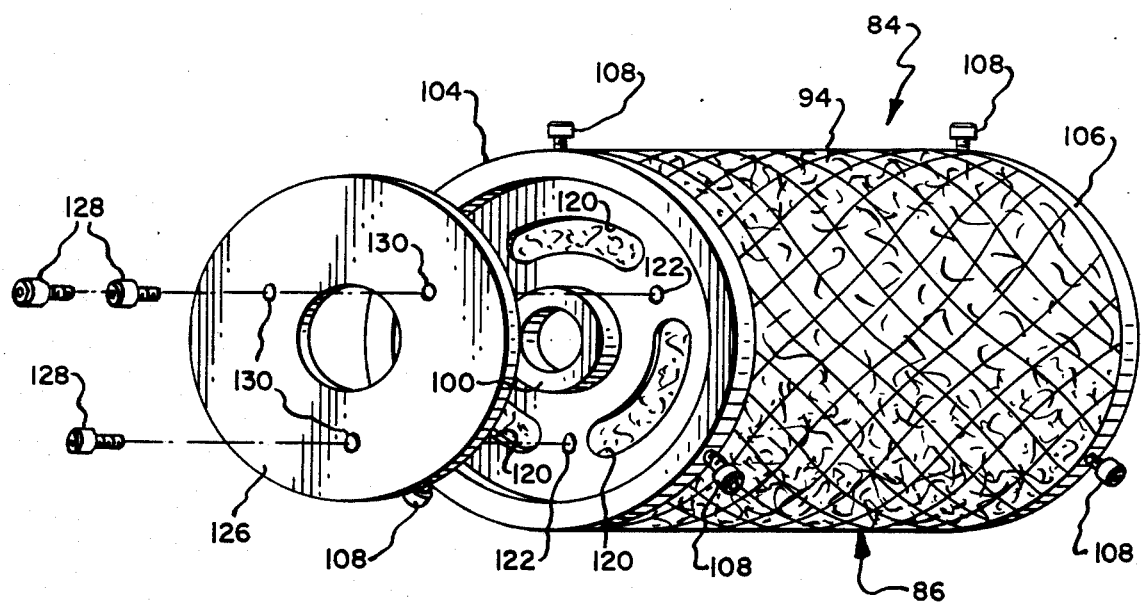
FIG. 4 is a perspective view of a desiccant canister utilized in the FIG. 1 embodiment shown with its end cap removed.

With reference still to FIG. 3, end wall 98 includes a circular end plate 110 which defines a central opening through which the inner ring 102 is received and which is suitably attached to the inner and outer rings 102 and 106 so as to span and cover the space therebetween. The end wall 96 includes an end frame 107 which, as best shown in FIG. 4 is generally planar and circular in shape and defines a central opening 109 positioned about the inner ring 100. Furthermore, the end frame 107 is attached to both the inner and outer rings 100 and 104, as by welding, so as to span the space therebetween and to define a recess in the corresponding canister end. With reference still to FIG. 4, the end frame 107 defines three relatively large kidney-shaped openings 120,120 and three smaller openings 122,122 positioned therebetween, and as shown in FIG. 3, three internally threaded studs 124 (only one shown) are welded or otherise fixedly attached to the inside surface of the frame 107 and adjacent the openings 122,122. The studs 124 are adapted to threadably receive the shanks of locking bolts hereinafter described and which are adapted to extend through the openings 122,122.

With reference again to FIG. 4, the end wall 96 further includes a platen end cap 126 adapted to be placed against the outside surface of the frame 107 and locked thereagainst so as to cover the kidney-shaped openings 120,120 of the frame 107. More specifically, the cap 126 defines a central opening having a diameter which is slightly larger than the outer diameter of the inner ring 100 and an outer diameter which is slightly smaller than the inner diameter of the inner ring 104 so that the end cap 126 can be placed between the inner and outer rings 100 and 104 so as to cover the frame openings 120,120. Furthermore, the cap 126 defines three small openings 130,130 which are alignable with the three smaller openings 122,122 of the frame 107. The openings 130,130 loosely receive the shank of locking bolts 128,128 so that the cap 126 can be tightly held against the frame 107 between the threaded studs 124 (only one shown in FIG. 3) and heads of the locking bolts 128,128. It follows from the above that the kidney openings 120,120, when uncovered, provide access to desiccant contained within the canister 84.

The locking bolts 128,128 each include a round head and at least two recesses therein which are adapted to matingly receive the studs of a special key for removal. For a more complete description of the locking bolts 128,128 utilized in the dryer 10, reference can be had to U.S. Pat. No. 3,821,975 incorporated herein by reference. The locking bolts 128,128 thus prevent tampering of the canister 84 by persons (i.e. unauthorized personnel), not possessing a special key for unlocking the bolts 128,128.

With reference again to FIG. 3, the canister 84 further includes a quantity of desiccant, generally indicated 140, contained within so as to substantially fill the space defined between the inner and outer sleeves 92 and 94 and be tightly held therebetween. It is believed that any of a number of desiccant materials can be utilized in the canister 84, but it has been found that a desiccant comprised of a rechargeable calcium sulfate material and available under the tradename Drierite from the Drierite Corp., Zenia, Ohio provides the canister 84 with effective drying capacity. It will be understood that the gas-permeable openings of the inner and outer sleeves 92 and 94 are of sufficient size to prevent desiccant 140 from sifting therethrough.

With reference to FIG. 2 and as mentioned earlier, the canisters 84,84 are arranged in an end-to-end relationship in the housing 32. As will be apparent hereinafter, the canisters 84,84 are adapted to permit gas to flow from the tubular member 70 and radially outwardly through the canister desiccant 140. For purposes of sealing the space between adjacent canisters 84,84 and the space between the housing end plate 54 and the canister 84 positioned adjacent the plate 54, ring-like gaskets 142,142 are appropriately placed therebetween.

In accordance with the present invention, the dryer 10 includes means, indicated 144, for biasing the ends of the canisters together to enhance the seal therebetween. As shown in FIG. 2, the biasing means 144 includes a compression spring 146 adapted to act between the housing end plate 62 and the end wall 98 of the rightwardmost canister 84, as shown, to force the canisters 84,84 toward the housing end plate 54. Thus, the canister ends are effectively pressed against one another between the end plate 54 and spring 146 to enhance the seal therebetween. It has been found that in operation, the pressure drop through each desiccant canister 84 or 84 is relatively low so that the strength of the spring 146 can be relatively small for purposes of sealing the canister ends.

To load or unload the dryer 10 with desiccant canisters 84,84, the housing end plate 62 is removed from the flange to provide access to the interior of the housing 32. Of course, the removal of the plate 62 renders the spring 146 unsupported at one end so that the spring can be simply taken out for unobstructed access to the rightwardmost, as shown in FIG. 2, canister 84. When loading the canister 84,84, the centering screws 108,108 should be adjusted appropriately to substantially center the canister inner sleeve 92 about the tubular member 70. To replace the end plate 62, the spring 146 is initially placed into operative position against the end of the rightwardmost canister and held thereat until the plate 62 is positioned against the spring 146 to provide support therefor. The plate 62 is then reattached to the flange 50 by means of the bolts 64,64 and nuts 66,66.

During an operation with the dryer 10, appropriate piping is connected to the open end 72 of the tubular member 70 to direct gas into the housing 32 and appropriate piping is connected to the conduit 42 for recapturing gas which exits the housing 32. As gas enters the tubular member 70, the gas flows axially therealong and leaves the member 70 through the apertures 80,80 defined along the foraminous portion 78. It will be understood that as the gas leaves the member portion 78, the apertures 80,80 direct the gas radially outwardly therefrom to the inner sleeves 92,92 of the canisters 84,84. Upon leaving the member portion 78, the gas flows radially outwardly through the canisters 84,84 from the inner sleeves 92,92 and through the outer sleeves 94,94 and so that all of the gas must travel radially outwardly through the canister desiccant 140. After moving through the outer sleeves 94,94, the gas travels along the interior surface of the housing shell 34 toward the outlet opening 44 in the conduit 42 where the gas exits the housing 32.

The aforedescribed dryer 10 is advantageous in that the gas flow therethrough effectively dries the gas and provides a relatively low pressure drop between the inlet and outlet openings of the housing. Thus, the capacity for moisture removal is high in relation to the amount of desiccant utilized. Furthermore, the dryer housing and canisters can be sized to accommodate a preselected gas flow rate.

The canisters 84,84 are advantageous in that the canister design permits desiccant to be easily and quickly replaced within the dryer 10. More specifically, desiccant replacement simply involves the replacement of the desiccant canisters. Of course, the utilization of rechargeable desiccant within the canister 84,84 permits the canisters to be regenerated for reuse. Thus, desiccant costs for maintaining the dryer 10 in operation are relatively low. Furthermore, because the desiccant 140 is tightly held between the canister inner and outer sleeves 92,94, the desiccant 140 effectively resists disturbances by gas surges so that the gas is prevented from channelling. Thus, it is believed that the distribution of gas flow across a cylindrical cross section of desiccant of a canister 84, which cross section is centered about the longitudinal axis of the canister 84, is relatively uniform.

For purposes of illustration, the following dimensions for the dryer 10 are provided. The outer diameter of the housing 32 is about 8.0 inches, length of the housing is about 10 feet, and each of the canisters is about 2.3 feet in length. It has been found that a dryer 10 having the aforementioned dimensions and including four canisters weighing not more than 50 pounds apiece is capable of drying natural gas up to 100° F. dewpoints. Furthermore, such a dryer is capable of drying up to 10,000 SCFD of natural gas with a water loading of 92 pounds of water per 1.0 million cubic feet of gas for about thirty days without replacing desiccant canister 84.

Figure 5:
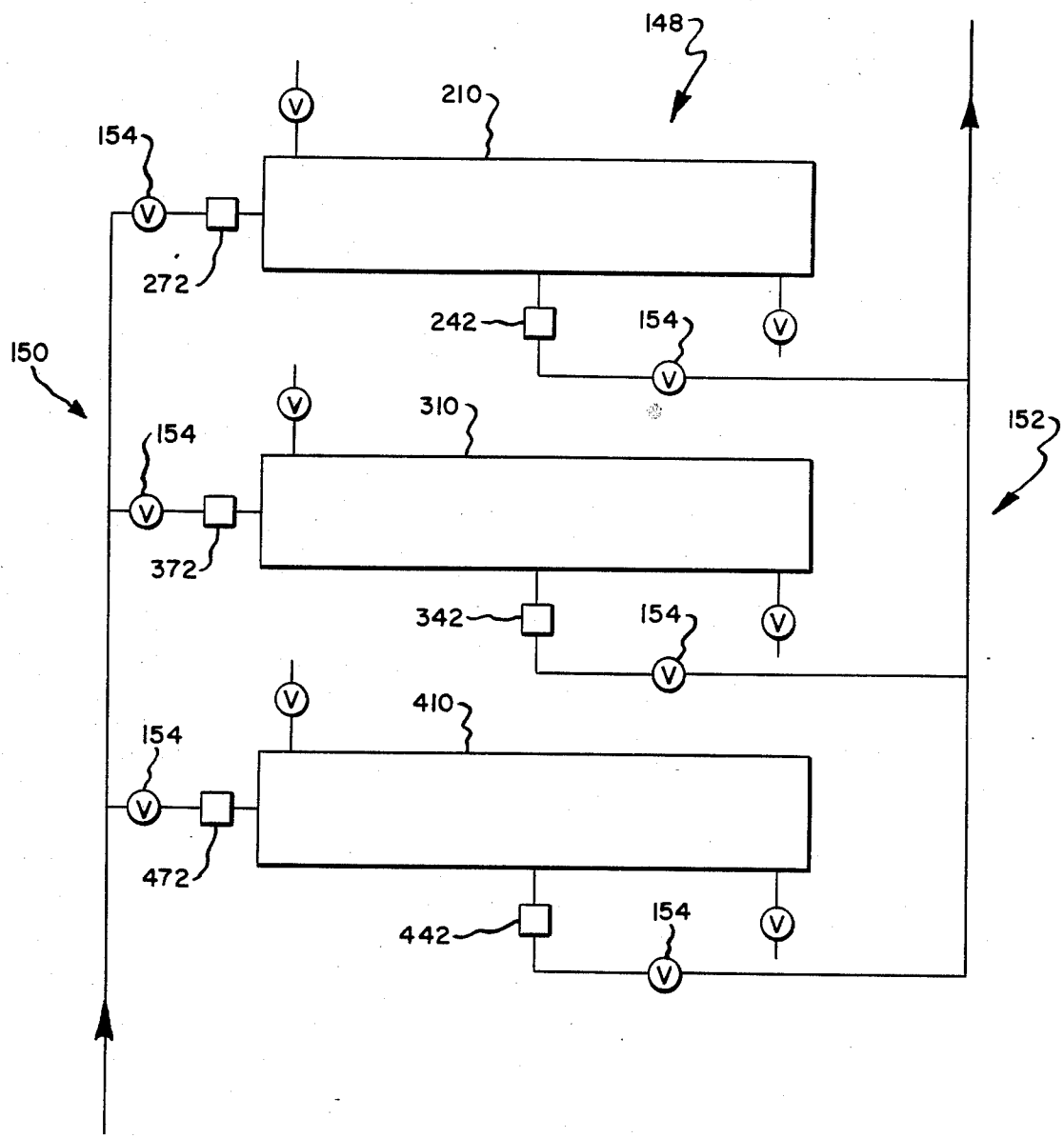
FIG. 5 is a schematic representation shown in block diagram form of an assembly of dryers in accordance with the present invention shown connected in parallel flow relation.

With reference to FIG. 5, there is shown a schematic representation of an assembly 148 of dryers having a construction like that of dryer 10 of FIGS. 1–4. The assembly includes dryers 210, 310, 410 having inlet connections 272, 372, 472, respectively, and outlet connections 242, 342, 442, respectively.

Appropriate piping, indicated 150, is connected to each dryer inlet 272, 372, 472, for directing gas to each dryer 210, 310, 410 and piping, indicated 152, is connected to each outlet 242, 342, 442 for directing gas out of each dryer 210, 310, 410. Valves 154, 154 are connected within the piping 150,152 for shutting off the gas flow through any one dryer. It will be understood that the aforedescribed dryers 210, 310, 410 are connected in parallel flow relation.

The foredescribed assembly 148 is suggested arrangement of dryers for a 30,000 SCFD natural gas well and exemplifies one of any number of dryer arrangements which can be assemblied for accommodating a preselected flow rate of gas or for providing a preselected pressure drop through the dryer assembly. For example, dryers can be added or removed from the assembly 148 to accommodate the flow rate of the gas well. Furthermore, the assembly 148 provides an advantage in that gas flow through one dryer can be shut off for purposes of changing the desiccant canisters therein while gas continues to flow through the remaining dryers of the assembly. Thus, the natural gas well with which the assembly 148 is utilized need not be shut off for purposes of changing desiccants.

It will be understood numerous substitutions and modifications can be made to the aforedescribed embodiments without departing from the spirit of the invention. For example, although several components of the dryer housing 32 and canister 84 have been described as being constructed of steel, the components can be made out of a variety of plastic materials suitable for the operating conditions and may be preferred over some types of steel for reducing effects of moisture and corrosion. Furthermore, the dryer dimensions can vary substantially from those listed above without adversely effecting the dryer performance.

Still further, although it is suggested above with regard to the dryer assembly 148 of FIG. 5 that the pressure drop in the gas line can be varied by adding or removing dryers therefrom, the pressure drop can also be varied across the individual dryers by removing or adding, if appropriate, canisters from or to the housing 32. The aforedescribed dryers have each been described as adapted to hold four canisters, but one or more canisters can be removed and a spacer substituted therefor if it is desired to increase the pressure drop between the dryer inlet and outlet, and a longer dryer housing can be provided for accepting five or more canisters if a reduced pressure drop is desired. Accordingly, the aforedescribed embodiments are intended for purposes of illustration and not as limitation.

We claim:

1. A desiccant dryer comprising:
    canister means defining an annular cavity for desiccant, said cavity having concentrically-arranged and cylindrically-shaped inner and outer walls and two end walls which are positioned at opposite ends of said cavity and which join said inner and outer walls, said inner and outer walls being gas-permeable;
    a quantity of desiccant positioned within so as to substantially fill said annular cavity;
    means defining a substantially enclosed elongated housing in which said desiccant canister is positioned and including means defining an inlet opening at one end of said housing and an outlet opening for gas entering and leaving said housing, said inlet opening being located generally centrally of said one housing end; and
    routing means in the form of a hollow tubular member supportedly attached to said housing at said one end thereof and including a portion which extends axially of said housing through the interior of said cylindrically-shaped inner wall of said cavity means for routing gas from said inlet opening into the interior of said cylindrically-shaped inner wall of said canister means, said extending portion of said tubular member defining apertures disposed therealong and therearound and being closed at an end thereof opposite said one housing end, said canister positioned about said tubular member with the inner wall thereof encircling said extending portion so that gas flowing through said tubular member from said inlet opening is directed radially outwardly through said apertures, said annular cavity and said quantity of desiccant contained therein toward said outlet opening and so that the entire length of the inner wall of said canister means is exposed to gas routed through the housing inlet opening.

2. A dryer as defined in claim 1 wherein said two end walls are oriented in planes which are generally parallel to one another and which are perpendicular to the longitudinal axis of said annular cavity.

3. A dryer as defined in claim 1 wherein one of said end walls has a cap portion which is removably attached to the remainder of said canister means and which, when removed therefrom, provides access to said quantity of desiccant contained within said cavity.

4. A dryer as defined in claim 3 wherein said one end wall includes an end frame attached between said inner and outer walls and which defines at least one access opening for providing access to said quantity of desiccant and said cap portion is releasably attached to said end frame for covering said access opening.

5. A dryer as defined in claim 4 wherein said canister means includes at least one locking bolt having a head which requires a special key for tightening and loosening the locking bolt and said cap portion is bolted to said end frame with said locking bolt.

6. A dryer as defined in claim 1 wherein said inner and outer walls are constructed of a mesh-like material.

7. A dryer as defined in claim 1 wherein said inner and outer walls are constructed of a wire mesh.

8. A dryer as defined in claim 1 wherein said desiccant is comprised of a calcium sulfate material.

9. A dryer as defined in claim 1 wherein said elongated housing defines an interior cavity including a cylindrically-shaped inner wall extending axially along said housing and having an inside diameter which is slightly larger than the outer diameter of said canister means for receiving said canister means and said dryer further includes means cooperating between said canister means and said housing for maintaining said outer walls of said canister means in spaced relationship with said inner wall of said interior cavity.

10. A dryer as defined in claim 9 wherein said cooperating means includes means for centering said canister means within said inner wall of said interior cavity.

11. A dryer as defined in claim 1 wherein said housing includes means providing access to said canister means so that said canister means can be removed from or placed into said housing.

12. A dryer as defined in claim 1, wherein said canister means is a first canister means and said dryer further includes a second canister means having a construction like that of said first canister means and said first and second canister means are positioned within said housing in an end-to-end relationship and so that the interiors of the inner walls of said first and second canister means are in flow communication with one another.

13. A dryer as defined in claim 12 wherein said extending portion of said tubular member extends through the interiors of the inner walls of said first and second canister means.

14. A dryer as defined in claim 13 further including means for biasing said first and second canister means in end-to-end engagement to enhance the seal between the end walls thereof.

15. A dryer as defined in claim 14 wherein said biasing means includes a compression spring for acting between an end of said housing and an end wall of one of said canister means for pressing said canister means against the opposite end of said housing.

16. A dryer as defined in claim 1 wherein said end walls of said annular cavity are gas-impermeable.

17. A desiccant dryer comprising:
canister means defining an annular cavity for desiccant, said cavity having concentrically-arranged and cylindrically-shaped inner and outer walls and two end walls which are positioned at opposite ends of said cavity and which join said inner and outer walls, said inner and outer walls being gas-permeable, said canister means including frame means located along said outer wall;
a quantity of desiccant positioned within so as to substantially fill said annular cavity;
means defining a substantially enclosed housing in which said desiccant canister is positioned and including means defining an inlet opening and an outlet opening for gas entering and leaving said housing, said housing defining an interior cavity including a cylindrically-shaped inner wall having an inside diameter which is slightly larger than the outer diameter of said canister means so that said canister means is positionable within said housing so that said outer walls of said canister means are in spaced relationship with said inner wall of said interior cavity;
routing means associated with said housing for routing gas from said inlet opening into the interior of said cylindrically-shaped inner wall of said canister means so that gas flowing through said housing travels radially outwardly through said annular cavity and said quantity of said desiccant contained therein toward said outlet opening; and
means for centering said canister means within said inner wall of said interior cavity including adjustable centering screws for acting between said outer wall of said canister means and said inner wall of said interior cavity.

18. A desiccant dryer comprising:
means defining an elongated and substantially enclosed housing having two opposite end walls and cylindrical sidewalls extending between said end walls, one of said end walls including means defining a centrally-positioned opening for gas entering said housing and a sidewall of said housing defining an opening for gas exiting said housing;
means defining a hollow tubular member having two opposite ends and a cylindrical surface extending between said two member ends, one of said tubular ends being open and the other member end being closed,
said tubular member being supportedly mounted within said housing so as to extend axially therealong with said open end attached to said one end wall of said housing and said closed end extending from said one end wall, said open end being sealingly connected to said opening-defining means of said one housing end wall and said cylindrical surface of said tubular member defining a plurality of apertures disposed therealong and therearound so that gas entering said housing end wall opening flows into said tubular member through said open end thereof and out of said defined apertures;
canister means defining an annular cavity for desiccant, said cavity having concentrically-arranged and cylindrically-shaped inner and outer walls and two end walls which are positioned at opposite ends of said cavity and which join said inner and outer walls, said inner and outer walls being gas-permeable and said canister means being positioned within said housing so that said tubular member extends through the interior of said inner wall of said canister means; and
a quantity of desiccant positioned within so as to substantially fill said annular cavity and so that gas routed from said housing inlet opening to said outlet opening travels radially outwardly of said tubular member through said apertures defined therein so that the entire length of the inner wall of said canister means is exposed to gas routed through said tubular member and radially outwardly of said canister means through said desiccant.

19. A dryer as defined in claim 18 wherein one of said end walls of said canister means has a portion which is releasably locked to the remainder of said canister means and which, when unlocked therefrom, provides access to said quantity of desiccant contained within said cavity.

20. A dryer as defined in claim 18 further comprising means for substantially centering said canister means between said sidewalls of said housing.

21. A dryer as defined in claim 20 wherein said means for substantially centering said canister means includes adjustable centering screws for acting between said outer wall of said canister means and said cylindrical sidewalls of said housing.

22. A desiccant dryer assembly comprising in combination:

means defining at least two elongated and substantially enclosed housings each having an interior cavity and defining an inlet opening and an outlet opening for gas entering and exiting said housing, said inlet opening being defined generally centrally and at one end of a corresponding housing;

canister means positioned within each interior cavity of said housing means and defining an annular cavity for desiccant, said cavity-defining means including two concentrically-arranged, gas-permeable inner and outer sleeves and two opposite and parallel end walls which with said inner and outer sleeves collectively provide said annular cavity;

a quantity of desiccant positioned within so as to substantially fill the annular cavity of each canister means;

a tubular member supportedly mounted within each of said housing means and including a tube having an open end which is sealingly connected to the inlet opening of a corresponding housing and having a closed end which extends axially through the interior of said inner sleeve of said canister means, the portion of said tube extending through said canister means having a closed end opposite said open end and defining a plurality of apertures disposed therealong and therearound so that gas routed from said inlet opening of said housing to said outlet opening thereof is directed through said open end of said tube, radially out of said tube through the apertures defined therein so that the entire length of the inner sleeve is exposed to gas routed through said tube and radially-outwardly through said canister means and desiccant toward said housing outlet opening; and means for connecting said housing means in parallel flow relation.

* * * * *